(12) United States Patent
Fujita

(10) Patent No.: US 9,930,193 B2
(45) Date of Patent: Mar. 27, 2018

(54) COMMUNICATION DEVICE WIRELESSLY COMMUNICATING WITH EXTERNAL DEVICE, CONTROL METHOD FOR COMMUNICATION DEVICE, AND STORAGE MEDIUM

(71) Applicant: CANON KABUSHIKI KAISHA, Tokyo (JP)

(72) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 15/163,448

(22) Filed: May 24, 2016

(65) Prior Publication Data

US 2016/0352930 A1 Dec. 1, 2016

(30) Foreign Application Priority Data

May 29, 2015 (JP) ................. 2015-109421

(51) Int. Cl.
*H04N 1/00* (2006.01)
*H04W 52/02* (2009.01)
*H04W 84/12* (2009.01)

(52) U.S. Cl.
CPC ..... *H04N 1/00206* (2013.01); *H04N 1/00251* (2013.01); *H04W 52/0235* (2013.01); *H04N 2201/0084* (2013.01); *H04W 84/12* (2013.01); *Y02B 60/50* (2013.01)

(58) Field of Classification Search
CPC ........... H04N 1/00206; H04N 1/00251; H04N 2201/0084; H04W 52/0235; H04W 84/12; Y02B 60/50
See application file for complete search history.

(56) References Cited

U.S. PATENT DOCUMENTS

| 2008/0261648 A1* | 10/2008 | Tomizu ............... | H04W 76/025 455/552.1 |
| 2010/0255784 A1* | 10/2010 | Ido ..................... | H04N 1/00244 455/41.2 |
| 2015/0065055 A1* | 3/2015 | Newham ............... | H04W 4/008 455/41.3 |
| 2016/0007401 A1* | 1/2016 | Ida ....................... | H04W 40/34 455/500 |
| 2016/0217617 A1* | 7/2016 | Barribeau ........... | G06F 3/04815 |
| 2017/0127472 A1* | 5/2017 | Wang .................. | H04W 76/064 |

FOREIGN PATENT DOCUMENTS

JP  2010-283791 A  12/2010

* cited by examiner

*Primary Examiner* — Timothy J Henn
(74) *Attorney, Agent, or Firm* — Canon U.S.A., Inc. IP Division

(57) ABSTRACT

A communication device includes an image capturing unit, a detection unit that continuously determines presence of an external device based on a image acquired by the image capturing unit, a first wireless communication unit that performs wireless communication, and a control unit that performs control so that processing for establishing wireless communication with the external device is started if the external device is detected by the detection unit, where the wireless communication with the external device is disconnected if the external device is not detected the wireless communication with the external device remains connected if the external device is detected again.

20 Claims, 14 Drawing Sheets

COMMUNICATION DEVICE WIRELESSLY COMMUNICATING WITH EXTERNAL DEVICE, CONTROL METHOD FOR COMMUNICATION DEVICE, AND STORAGE MEDIUM

BACKGROUND

Field

Aspects of the present invention generally relate to a communication device to be connected to an external device.

Description of the Related Art

In recent years, size and weight of digital cameras have been reduced, and a camera that can be attached to a human body has been known. Such a camera is called a wearable camera. An important characteristic of the wearable camera is hands-free operability by which a user can capture an image without using his/her hands. For example, a user wears an eyeglass-type wearable camera on an area near his/her eyes, and simply looks at an object. This enables an image of the object to be captured, unlike a conventional digital camera that a user needs to hold with the user's hands.

Digital cameras have recently started to include wireless communication functions. In addition, an application causing a digital camera to cooperate with another digital camera has been proposed. For example, the configuration in which a captured image is transmitted and received between digital cameras using a wireless local area network (LAN) communication function has been proposed.

However, in a case where cooperation of a web camera and a digital camera using a wireless communication function is taken into consideration, the following points are not fully considered in Japanese Patent Application Laid-Open No. 2010-283791. First, the hands-free operability, which is an intrinsic characteristic of the wearable camera, should not be degraded in an operation for connection. Secondly, since the wearable camera and the digital camera are battery driven devices, a wireless LAN should be disconnected to achieve energy saving when the communication is not needed. The wearable camera is particularly designed on the premise that a user wears it. For this reason, the wearable camera needs to be smaller and lighter than a digital camera and other mobile devices such as a mobile phone. Consequently, size and capacity of the battery of the wearable camera are limited, and a sufficient amount of drive time needs to be obtained with due consideration of such limitations.

SUMMARY

According to an aspect of the present invention, a communication device includes an image capturing unit configured to capture a object to acquire an image of the object, a detection unit configured to continuously determine presence of an external device based on the image acquired by the image capturing unit, a first wireless communication unit configured to perform wireless communication according to a first communication standard, and a control unit configured to perform control so that processing for establishing wireless communication with the external device via the first wireless communication unit is started if the external device is detected by the detection unit, wherein, if the external device is not detected by the detection unit for a certain time period or certain number of times after the wireless communication with the external device is established by the first wireless communication unit, the control unit performs control so that the wireless communication with the external device by the first wireless communication unit is disconnected, and wherein, if the external device is again detected by the detection unit before the certain time period elapses, the control unit performs control so that the wireless communication with the external device by the first wireless communication unit remains connected.

Further features of aspects of the present invention will become apparent from the following description of exemplary embodiments with reference to the attached drawings.

DESCRIPTION OF THE EMBODIMENTS

Hereinafter, exemplary embodiments of the present invention will be described in detail below with reference to the drawings.

Each of the following exemplary embodiments is one example of aspects of the present invention, and may be corrected or modified as appropriate according to configurations of a device to which the exemplary embodiment of the present invention is applied and various conditions. Moreover, the exemplary embodiments may be appropriately combined within the scope of aspects of the present invention.

<Configuration of Digital Camera>

Figure 1:
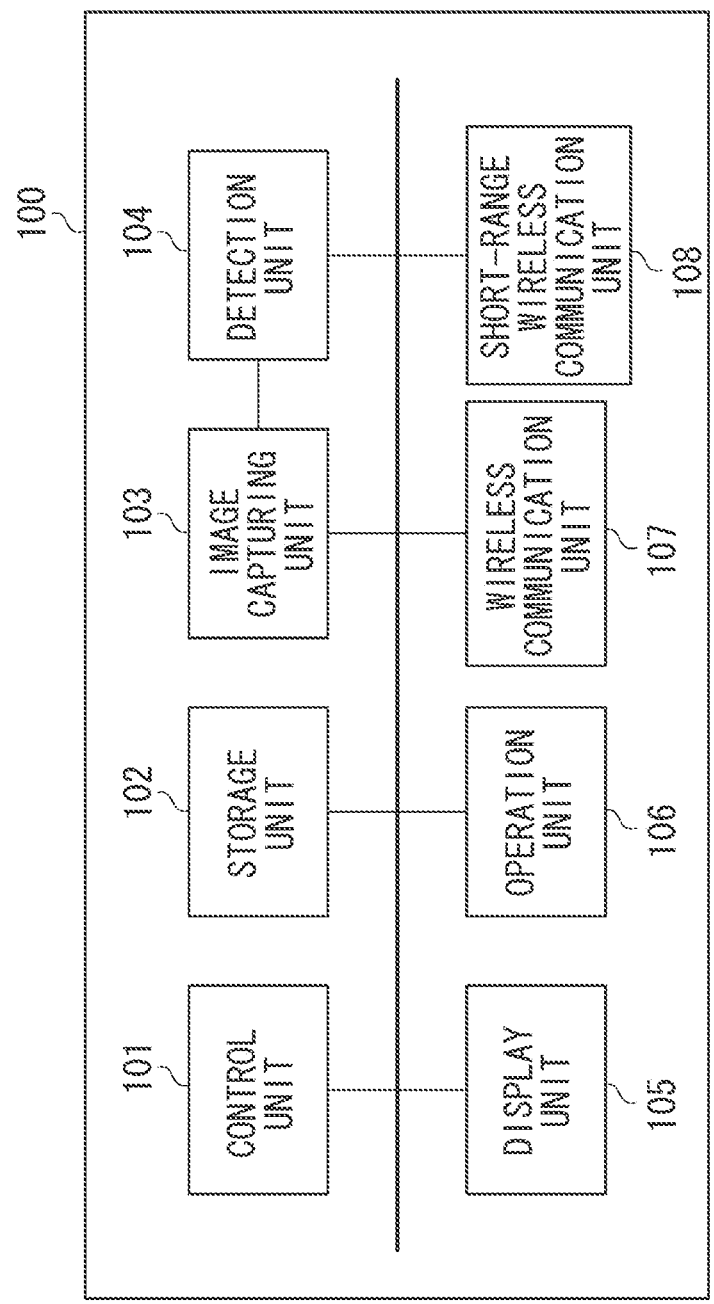
FIG. 1 is a block diagram illustrating a hardware configuration of a wearable camera according to a first exemplary embodiment of the present invention.

A first exemplary embodiment of the present invention is described. FIG. 1 is a block diagram illustrating a configuration example of a wearable camera 100 serving as one example of a communication device according to the present exemplary embodiment.

A control unit 101 comprehensively controls the wearable camera 100 by executing a control program stored in a storage unit 102. The control unit 101 includes at least one processor such as a central processing unit (CPU) and a micro processing unit (MPU).

The storage unit 102 is used as an area for storing the control program to be executed by the control unit 101. Moreover, the storage unit 102 is used as a working memory when the control program is executed. The storage unit 102 is also used as an area for loading an image acquired by an image capturing unit 103, and an area for storing communication parameter information of a wireless communication unit 107 and a short-range wireless communication unit 108. The storage unit 102 includes a read only memory (ROM), a random access memory (RAM), a hard disk drive (HDD), and a flash memory.

The image capturing unit 103 includes an optical lens, a complementary metal-oxide-semiconductor (CMOS) sensor, and a digital image processing unit. The image capturing unit 103 converts an analog signal input via the optical lens into a digital signal to acquire an image. The image acquired by the image capturing unit 103 is loaded into the storage unit 102, and input into a detection unit 104.

The detection unit 104 analyzes the image input by the image capturing unit 103 to determine whether a digital camera is included within the image. In the present exemplary embodiment, the detection unit 104 first determines whether a predetermined marker (an example of a two-dimensional bar code is described) is included in the image. If the predetermined marker is included in the image, the detection unit 104 determines whether the two-dimensional bar code includes information that identifies the digital camera. Such determination processing is executed on a frame-by-frame basis of an image to be input. The detection unit 104 notifies the control unit 101 of a detection result indicating the presence or absence of detection of the digital camera. That is, determination is continuously performed.

A display unit 105, such as a liquid crystal display (LCD) and a light emitting diode (LED), has a function of outputting visually recognizable information.

An operation unit 106 receives various inputs from a user, and informs the control unit 101 of the input information. The operation unit 106 includes a button, for example.

The wireless communication unit 107 serves as an interface for connecting the wearable camera 100 and an external device via an antenna. The wireless communication unit 107 includes a communication controller or a modem circuit for transmitting and receiving radio signals. In the present exemplary embodiment, the wireless communication unit 107 executes wireless LAN communication that conforms to communication standards of Institute of Electrical and Electronics Engineers (IEEE) 802.11. The wireless communication unit 107 also executes wireless LAN connection processing that conforms to communication standards of Wi-Fi Direct (registered trademark). The wireless communication unit 107 has two separate states of a power-on state (an enabled state) and a power-off state (a disabled state) each serving as a power supply operating state of the wireless communication unit 107. The power-on state represents a state in which the wireless communication unit 107 is operated similarly to other processing units. In the power-on state, the wireless LAN communication is executable. On the other hand, the power-off state represents a state in which the power supply to the wireless communication unit 107 is cut off, or the wireless communication unit 107 is in a low-power consumption state. In the power-off state, the wireless LAN communication is not executable. The control unit 101 controls transition between the power-on state and the power-off state.

The short-range wireless communication unit 108 serves as an interface for performing wireless communication using a communication method different from that used by the wireless communication unit 107. The short-range wireless communication unit 108 is installed as a communication unit that is separate from the wireless communication unit 107. In the present exemplary embodiment, the short-range wireless communication unit 108 performs communication that conforms to communication standards of Low Energy (LE) defined by Bluetooth (registered trademark) version 4.0.

The hardware configuration of the wearable camera 100 has been described.

The configuration illustrated in FIG. 1 is one example. The hardware configuration of the wearable camera 100 may include a processing unit other than that illustrated in FIG. 1.

<Configuration of Digital Camera (External Device)>

Figure 2:
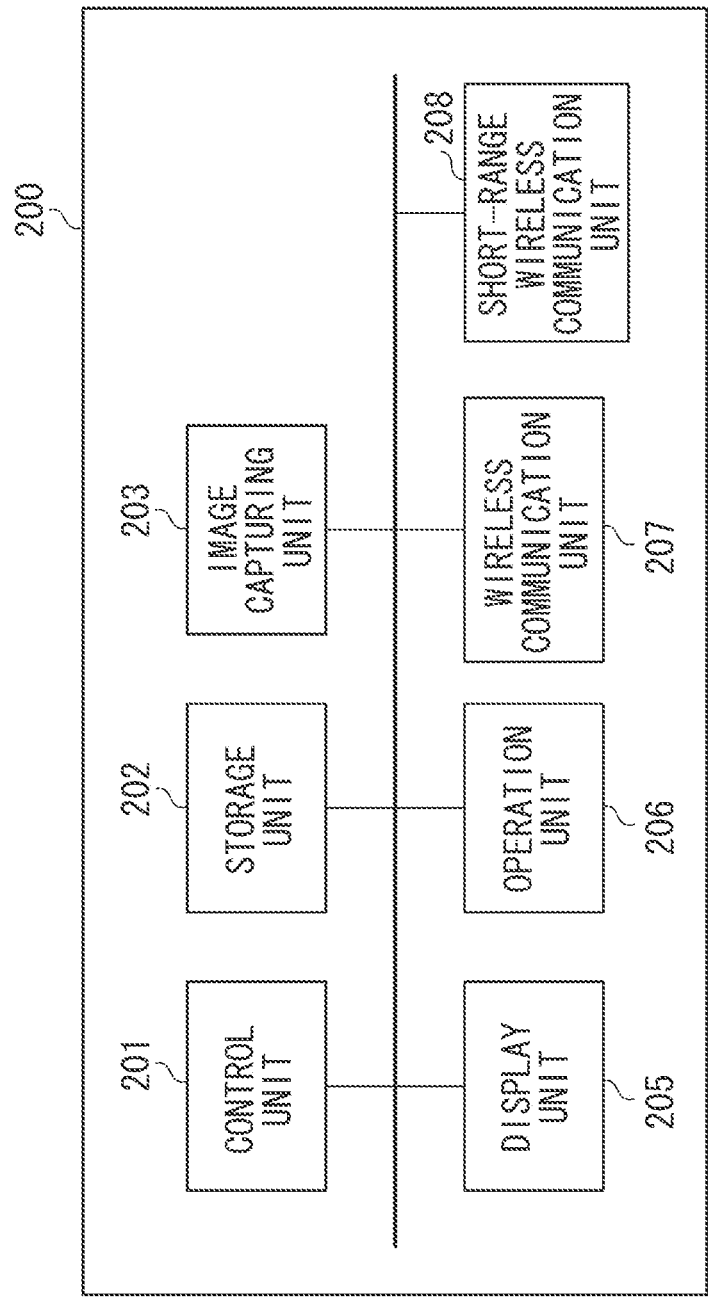
FIG. 2 is a block diagram illustrating a hardware configuration of a digital camera according to the first exemplary embodiment.

FIG. 2 is a block diagram illustrating a configuration of a digital camera 200 serving as one example of an external device according to the present exemplary embodiment. In the present exemplary embodiment, the digital camera 200 is described as one example of the external device. However, the external device is not limited to the digital camera 200. For example, the external device may be a portable media player, a tablet device, and information processing apparatus such as a personal computer.

A control unit 201 comprehensively controls the digital camera 200 by executing a control program stored in a storage unit 202. The control unit 201 includes at least one processor such as a CPU and an MPU.

The storage unit 202 is used as an area for storing the control program to be executed by the control unit 201. Moreover, the storage unit 202 is used as a working memory when the control program is executed. The storage unit 202 is also used as an area for loading an image acquired by an image capturing unit 203, and an area for storing communication parameter information of a wireless communication unit 207 and a short-range wireless communication unit 208. The storage unit 202 includes a ROM, a RAM, an HDD, and a flash memory.

The image capturing unit 203 includes an optical lens, a CMOS sensor, and a digital image processing unit. The image capturing unit 203 converts an analog signal input via the optical lens into a digital signal to acquire an image. The image acquired by the image capturing unit 203 is loaded into the storage unit 202.

A display unit 205, such as an LCD and an LED, has a function of outputting visually recognizable information. Moreover, the display unit 205 displays a two-dimensional bar code that is used to identify the digital camera 200.

An operation unit 206 receives various inputs from the user, and informs the control unit 201 of the input information. The operation unit 206 includes, for example, a touch panel and a button.

The wireless communication unit 207 serves as an interface for connection with an external device via an antenna.

The wireless communication unit 207 includes a communication controller or a modem circuit for transmitting and receiving radio signals. In the present exemplary embodiment, the wireless communication unit 207 executes wireless LAN communication conforming to communication standards of IEEE 802.11. The wireless communication unit 207 also executes wireless LAN connection processing conforming to communication standards of Wi-Fi Direct. The wireless communication unit 107 has two separate states of a power-on state (an enabled state) and a power-off state (a disabled state) each serving as a power supply operating state of the wireless communication unit 207. The power-on state represents a state in which the wireless communication unit 207 is operated as similar to other processing units. In the power-on state, the wireless LAN communication is executable. On the other hand, the power-off state represents a state in which the power supply to the wireless communication unit 207 is cut off, or the wireless communication unit 207 is in a low-power consumption state. In the power-off state, the wireless LAN communication is not executable. The control unit 201 controls transition between the power-on state and the power-off state.

The short-range wireless communication unit 208 serves as an interface for performing wireless communication using a communication method different from that used by the wireless communication unit 207. The short-range wireless communication unit 208 is installed as a communication unit that is separate from the wireless communication unit 207. In the present exemplary embodiment, the short-range wireless communication unit 208 performs communication conforming to communication standards of LE defined by Bluetooth (registered trademark) version 4.0.

The digital camera 200 has two operating modes of an image capturing mode and a playback mode. In the image capturing mode, the digital camera 200 stores an image input from the image capturing unit 203 in the storage unit 202. In the playback mode, the digital camera 200 displays the image stored in the storage unit 202 on the display unit 205. The control unit 201 controls transition between the image capturing mode and the playback mode when the user operates the operation unit 206.

The hardware configuration of the digital camera 200 has been described.

The configuration illustrated in FIG. 2 is one example. The hardware configuration of the digital camera 200 may include a processing unit other than that illustrated in FIG. 2.

<System Configuration>

Figure 3:
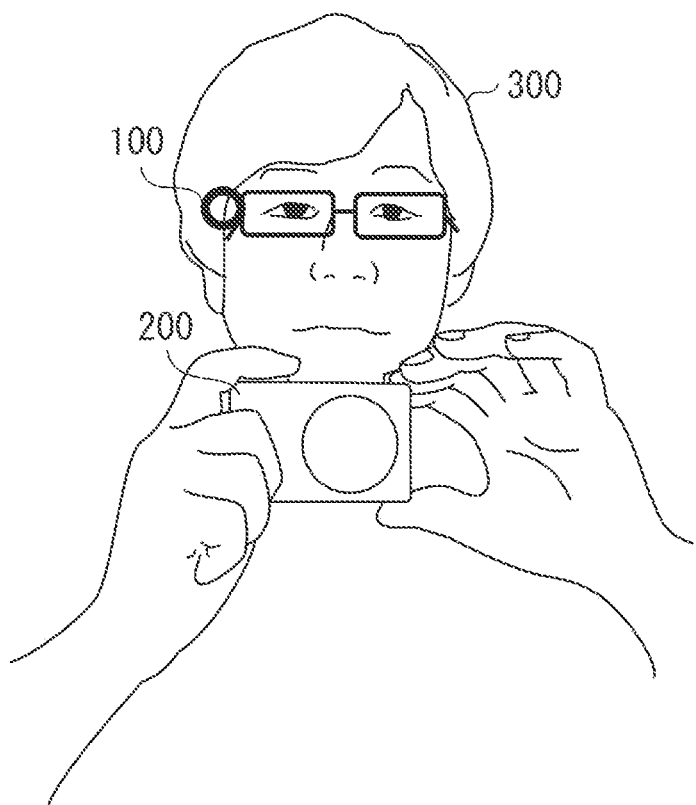
FIG. 3 is a diagram illustrating a system configuration according to the first exemplary embodiment.

FIG. 3 is a diagram illustrating usage of the wearable camera 100 and the digital camera 200 in the present exemplary embodiment. In FIG. 3, a user 300 wears the eyeglass-type wearable camera 100 with his hands holding the digital camera 200. The user 300 captures an image while checking a through-the-lens image produced on the display unit 205 of the digital camera 200. Since the wearable camera 100 is positioned near the eyes of the user 300, a target captured as an object by the image capturing unit 203 is substantially the same as a field of view of the user 300. Thus, when the user 300 looks at the display unit 205 of the digital camera 200, the image capturing unit 203 of the wearable camera 100 also captures the digital camera 200 as an object. Hereinafter, description is provided on the premise that such a usage pattern is applied.

<Wireless LAN Connection Control Sequence>

Figure 4:
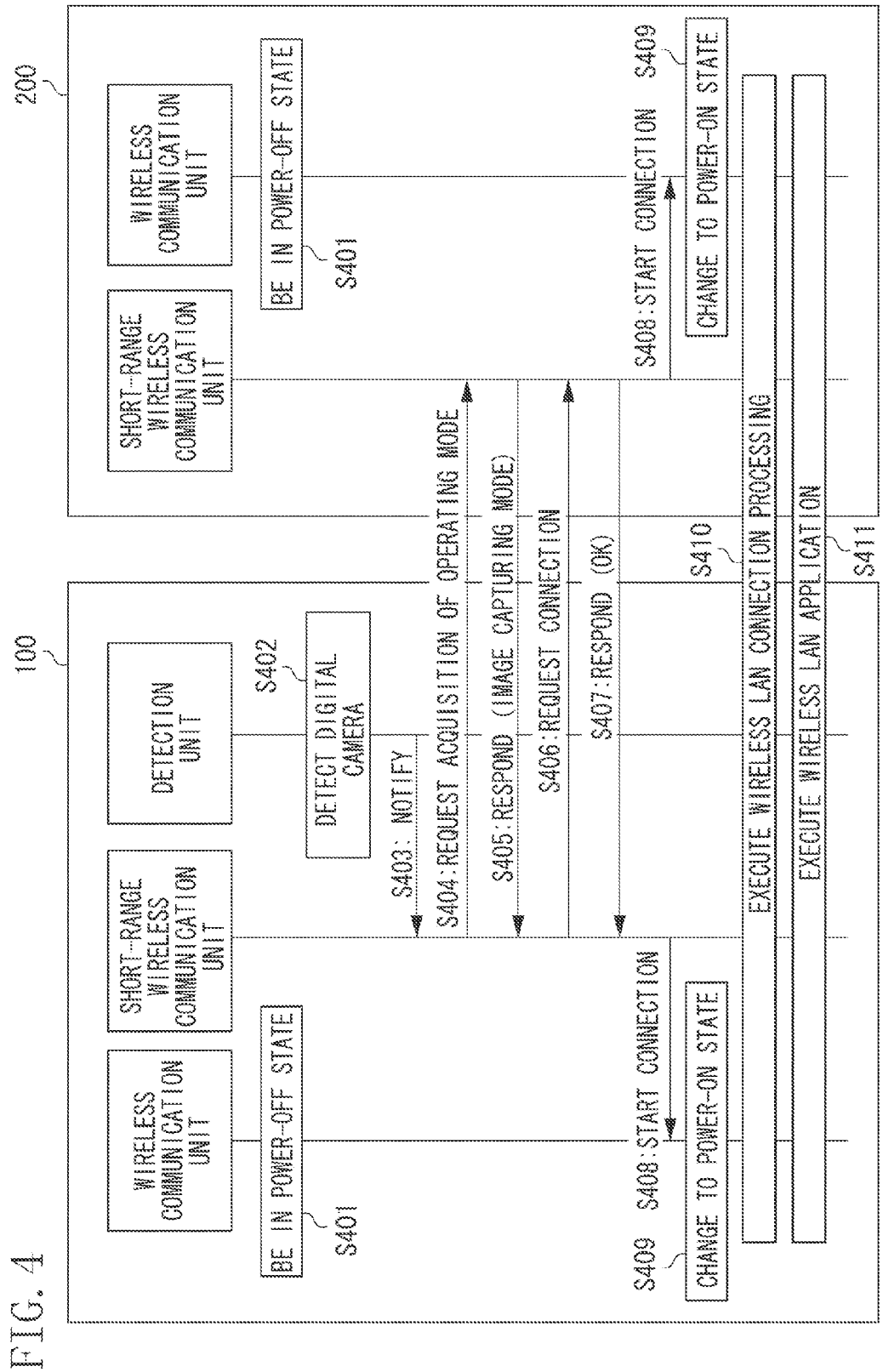
FIG. 4 is a sequence diagram illustrating connection processing of wireless local area network (LAN) communication according to the first exemplary embodiment.

FIG. 4 is a sequence diagram illustrating connection processing of wireless LAN communication between the wearable camera 100 and the digital camera 200 according to the first exemplary embodiment.

Assume that the short-range wireless communication unit 108 of the wearable camera 100 and the short-range wireless communication unit 208 of the digital camera 200 are paired using Bluetooth (registered trademark) in advance as an initial state.

In step S401, power supply operating states of the wireless communication unit 107 of the wearable camera 100 and the wireless communication unit 207 of the digital camera 200 indicate that the wireless communication unit 107 and the wireless communication unit 207 have transitioned to power-off states.

Figure 5:
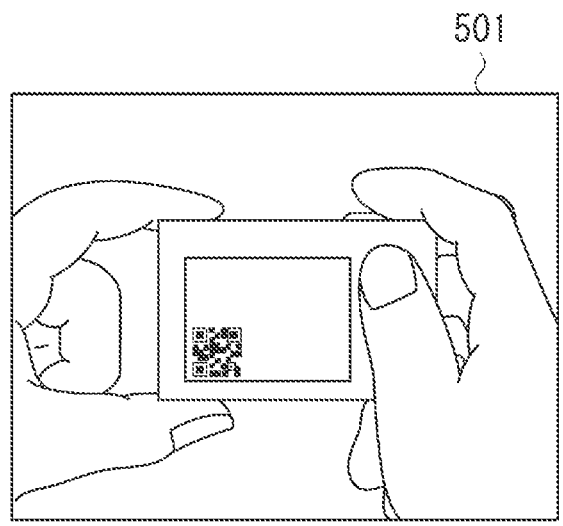
FIG. 5 is a diagram illustrating one example of an image captured by the wearable camera according to the first exemplary embodiment.

In step S402, the detection unit 104 of the wearable camera 100 detects that the digital camera 200 is included in an image captured by the image capturing unit. For example, the digital camera 200 displays a two-dimensional bar code on the display unit 205, and the image capturing unit of the wearable camera 100 captures an image of the two-dimensional bar code. As a result, an image 501 illustrated in FIG. 5 is acquired. The detection unit 104 of the wearable camera 100 recognizes the two-dimensional bar code in the image 501, and thus detects that the digital camera 200 is included within the field of view of the user 300. With such processing, the detection unit 104 determines whether the digital camera 200 is present as if the digital camera 200 were present within the field of view of the user 300.

In step S403, the detection unit 104 of the wearable camera 100 notifies the control unit 101 of detection of the digital camera 200. Upon receipt of the notification, the control unit 101 notifies the short-range wireless communication unit 108 of the same information.

In step S404, the short-range wireless communication unit 108 of the wearable camera 100 transmits a packet to request acquisition of operating mode information of the digital camera 200 to the short-range wireless communication unit 208 of the digital camera 200. The operating mode information of the digital camera 200 may be included in the two-dimensional bar code detected in step S402. In such a case, the digital camera 200 displays a two-dimensional bar code corresponding to the current mode.

In step S405, the short-range wireless communication unit 208 of the digital camera 200 transmits information about the operating mode of the digital camera 200 to the short-range wireless communication unit 108 of the wearable camera 100 as a response to the processing in step S404. Herein, for example, if information indicating an image capturing mode or a playback mode is transmitted, the processing proceeds to step S406 and subsequent steps by which wireless LAN communication is connected. On the other hand, if information indicating neither the image capturing mode nor the playback modem is transmitted, the processing ends without executing connection of the wireless LAN communication. In the present exemplary embodiment, the information indicating the image capturing mode is transmitted for the sake of description.

In step S406, the short-range wireless communication unit 108 of the wearable camera 100 transmits a packet to request connection of the wireless LAN communication to the short-range wireless communication unit 208 of the digital camera 200.

In step S407, the short-range wireless communication unit 208 of the digital camera 200 transmits information indicating connection permission to the short-range wireless communication unit 108 of the wearable camera 100 as a response to the processing in step S406.

In step S408, the short-range wireless communication unit 108 of the wearable camera 100 notifies the control unit 101 of a connection start event of the wireless LAN communication. Moreover, the short-range wireless communication unit 208 of the digital camera 200 also notifies the control unit 201 of a connection start event of the wireless LAN communication.

In step S409, the control unit 101 of the wearable camera 100 changes the power supply operating state of the wireless communication unit 107 to a power-on state. The control unit 201 of the digital camera 200 also changes the power supply operating state of the wireless communication unit 207 to a power-on state.

In step S410, communication connection in the wireless LAN communication using Wi-Fi Direct is established between the wireless communication unit 107 of the wearable camera 100 and the wireless communication unit 207 of the digital camera 200.

In step S411, a wireless LAN application is executed between the wireless communication unit 107 of the wearable camera 100 and the wireless communication unit 207 of the digital camera 200.

The example of the wireless LAN communication using Wi-Fi Direct has been described. However, Wi-Fi Direct may not necessarily be used. For example, a parameter to be used in the wireless LAN communication may be transmitted in step S407, and the parameter may be used to execute the processing in step S410, so that communication connection in the wireless LAN communication may be established. In such a case, in step S407, for example, information such as a secondary socket identifier (SSID) and a password is transmitted.

<Wireless LAN Connection Control Flow>

Figure 6:
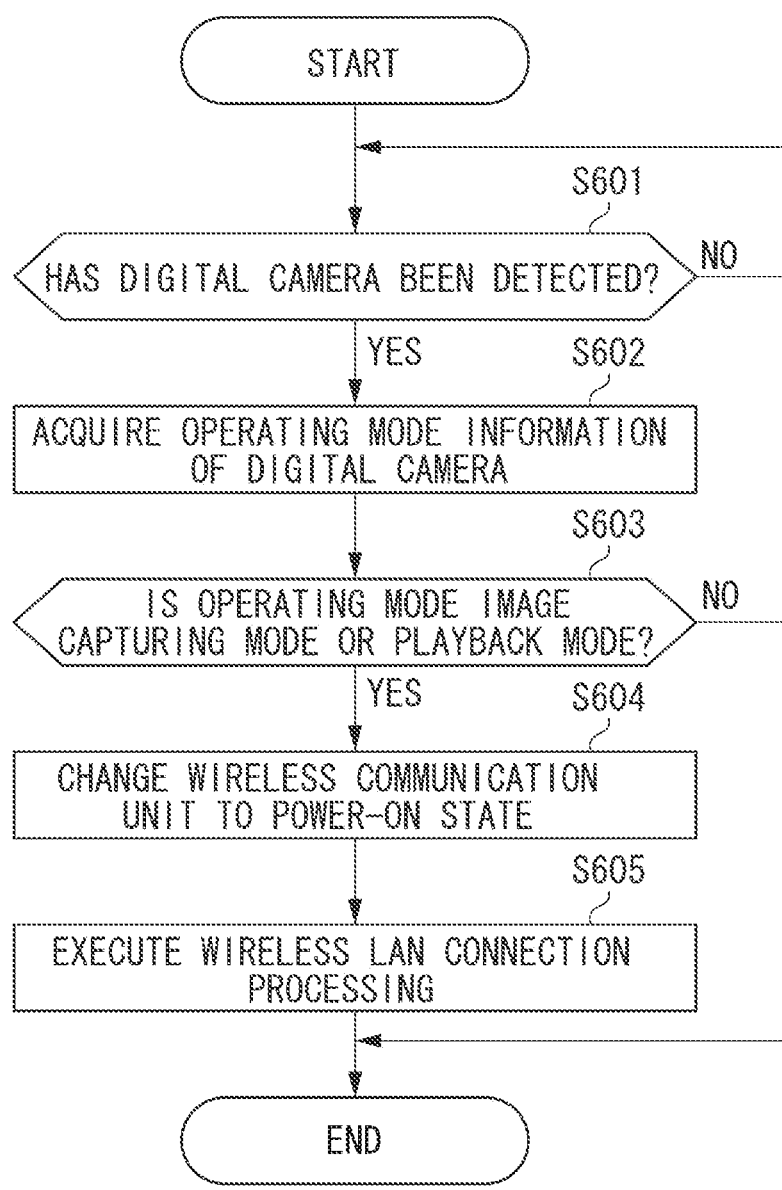
FIG. 6 is a flowchart illustrating a procedure for controlling connection of the wireless LAN communication according to the first exemplary embodiment.

FIG. 6 is a flowchart illustrating a procedure performed by the control unit 101 of the wearable camera 100 to control connection of the wireless LAN communication according to the present exemplary embodiment.

In step S601, the control unit 101 determines whether the digital camera 200 has been detected via the detection unit 104. The processing in step S601 corresponds to that in step S402 illustrated in FIG. 4. If the control unit 101 determines that the digital camera 200 has been detected via the detection unit 104 (YES in step S601), the processing proceeds to step S602.

In step S602, the control unit 101 controls the short-range wireless communication unit 108 to acquire information about an operating mode of the digital camera 200. The processing in step S602 corresponds to that in steps S404 through S405 illustrated in FIG. 4.

In step S603, the control unit 101 determines whether the operating mode acquired in step S602 is a mode indicating an image capturing mode or a playback mode. If the control unit 101 determines that the operating mode is either one of the modes (YES in step S603), the processing proceeds to step S604. If the control unit 101 determines that the operating mode is neither one of the modes (NO in step S603), the flow ends without further processing. When the operating mode is neither one of the image capturing mode nor the playback mode, the digital camera 200 may have been powered off.

In step S604, the control unit 101 changes the power supply operating state of the wireless communication unit 107 to a power-on state. The processing in step S604 corresponds to that in step S409 illustrated in FIG. 4.

In step S605, the control unit 101 controls the wireless communication unit 107, so that wireless LAN communication using Wi-Fi direct is connected between the wearable camera 100 and the digital camera 200. The processing in step S605 corresponds to that in step S410 illustrated in FIG. 4.

As described above, the digital camera 200 is simply provided in the field of view of the user 300, so that wireless LAN communication can be established between the digital camera 200 and the wearable camera 100. Therefore, the wireless LAN communication can be readily established without an operation such as a menu operation for connection with respect to the wearable camera 100 or the digital camera 200.

<Wireless LAN Disconnection Control Sequence>

A description is provided of disconnection processing of the communication established as described above.

Figure 7:
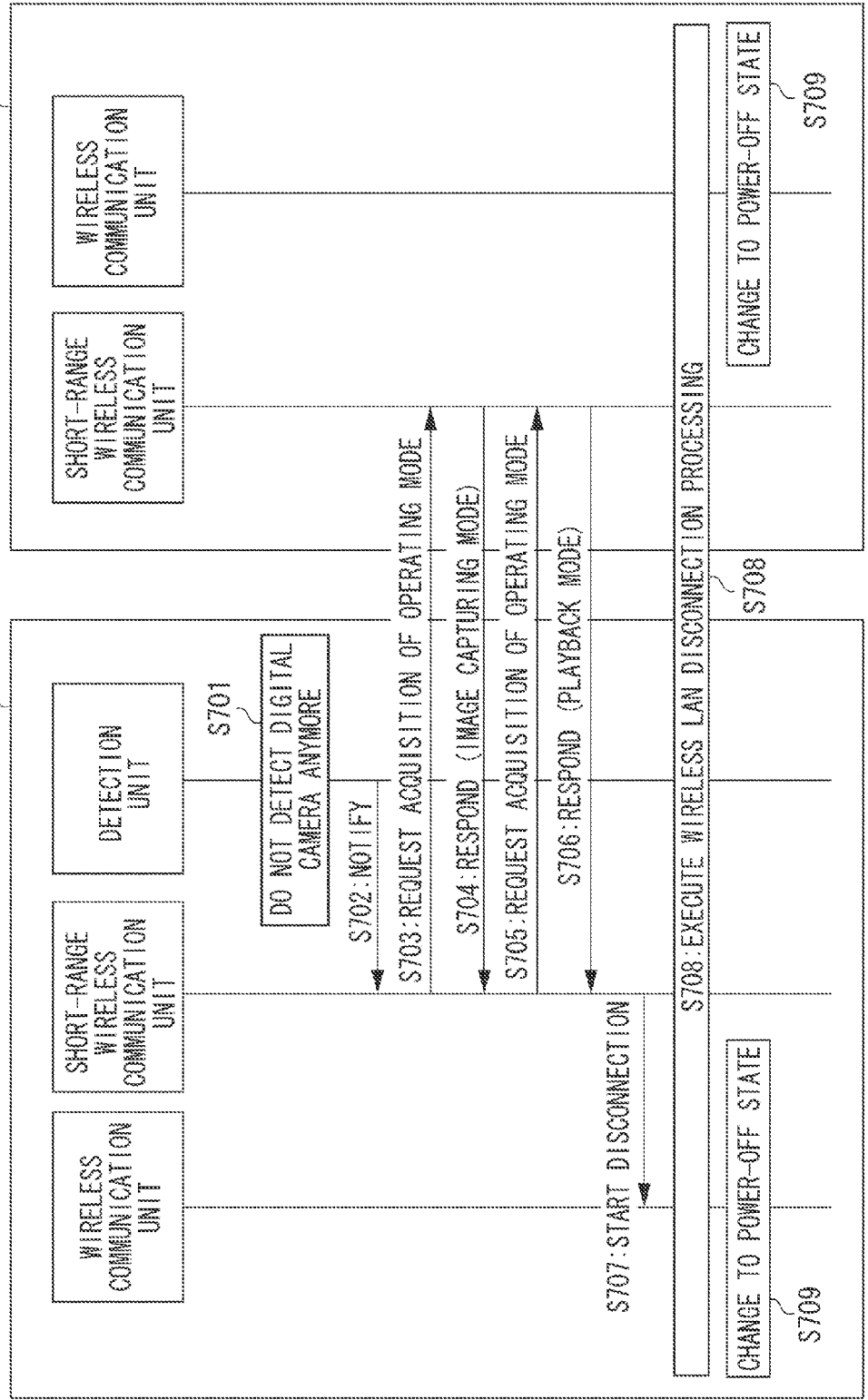
FIG. 7 is a sequence diagram illustrating disconnection processing of the wireless LAN communication according to the first exemplary embodiment.

FIG. 7 is a sequence diagram illustrating disconnection processing of the wireless LAN communication between the wearable camera 100 and the digital camera 200 according to the present exemplary embodiment.

Assume that the wireless LAN communication connection processing described above with reference to FIG. 4 is executed in advance as an initial state.

In step S701, the detection unit 104 of the wearable camera 100 detects that the digital camera 200 is not included in the image anymore. In other words, the detection unit 104 detects that a two-dimensional bar code of the digital camera 200 is no longer recognized from the image. Such detection is substantially equivalent to detection of a case where the digital camera 200 is out of the field of view of the user 300.

In step S702, the detection unit 104 of the wearable camera 100 notifies the control unit 101 that the digital camera 200 is not detected anymore. Upon receipt of the notification, the control unit 101 notifies the short-range wireless communication unit 108 of the same information.

In step S703, the short-range wireless communication unit 108 of the wearable camera 100 transmits a packet to request acquisition of operating mode information of the digital camera 200 to the short-range wireless communication unit 208 of the digital camera 200.

In step S704, the short-range wireless communication unit 208 of the digital camera 200 transmits information about the operating mode of the digital camera 200 to the short-range wireless communication unit 108 of the wearable camera 100 as a response to the processing in step S703. Herein, assume that information indicating an image capturing mode is transmitted. In such a case, the wearable camera 100 remains connected. The user 300 may capture an image without arranging the camera in the field of view thereof so that the image is captured from a desired angle. The user 300 may capture an image without holding the digital camera with his hands, or reach out his hand(s) holding the digital camera to capture an image. In the image capturing mode, therefore, even if the camera is out of the field of view of the user 300, the communication remains connected to prevent unnecessary communication disconnection in any of such cases.

In step S705, the short-range wireless communication unit 108 of the wearable camera 100 again transmits a packet to request acquisition of the operating mode information of the digital camera 200 to the short-range wireless communication unit 208 of the digital camera 200. The processing in steps S703 through S705 is repeated until information indicating a mode other than the image capturing mode is received.

In step S706, the short-range wireless communication unit 208 of the digital camera 200 transmits information about the operating mode of the digital camera 200 to the short-range wireless communication unit 108 of the wearable camera 100 as a response to the processing in step S705. Herein, assume that information indicating a playback mode is transmitted.

Subsequently, in step S707, the short-range wireless communication unit 108 of the wearable camera 100 notifies the control unit 101 of a disconnection start event of the wireless LAN communication.

In step S708, communication connection of the wireless LAN communication between the wireless communication unit 107 of the wearable camera 100 and the wireless communication unit 207 of the digital camera 200 is disconnected.

In step S709, the control unit 101 of the wearable camera 100 changes the power supply operating state of the wireless communication unit 107 to a power-off state. Moreover, the control unit 201 of the digital camera 200 changes the power supply operating state of the wireless communication unit 207 to a power-off state.

<Wireless LAN Disconnection Control Flow>

Figure 8:
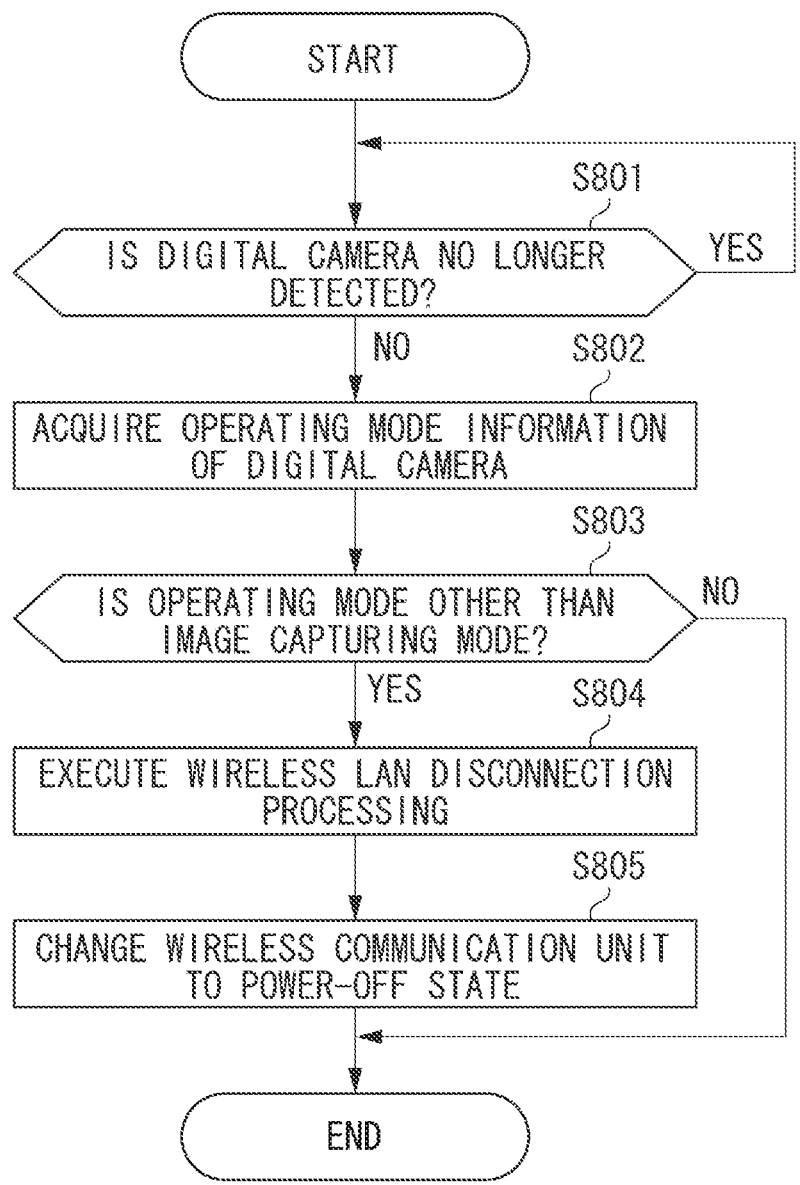
FIG. 8 is a flowchart illustrating a procedure for controlling disconnection of the wireless LAN communication according to the first exemplary embodiment.

FIG. 8 is a flowchart illustrating a procedure performed by the control unit 101 of the wearable camera 100 to control disconnection of the wireless LAN communication according to the present exemplary embodiment.

In step S801, the control unit 101 determines whether the digital camera 200 is no longer detected by the detection unit 104. The processing in step S801 corresponds to that in step S701 illustrated in FIG. 7. If the control unit 101 determines that the digital camera 200 is no longer detected (NO in step S801), the processing proceeds to step S802.

In step S802, the control unit 101 controls the short-range wireless communication unit 108 to acquire information about an operating mode of the digital camera 200. The processing in step S802 corresponds to that in step S703 or S706 illustrated in FIG. 7.

In step S803, the control unit 101 determines whether the operating mode acquired in step S802 indicates a mode other than the image capturing mode. If the control unit 101 determines that the mode is other than the image capturing mode (YES in step S803), the processing proceeds to step S804. On the other hand, if the control unit 101 determines that the mode is the image capturing mode (NO in step S803), the processing returns to step S801.

In step S804, the control unit 101 controls the wireless communication unit 107 to execute processing by which communication connection of the wireless LAN communication between the wearable camera 100 and the digital camera 200 is disconnected. The processing in step S804 corresponds to that in step S708 illustrated in FIG. 7.

In step S805, the control unit 101 changes the power supply operating state of the wireless communication unit 107 to a power-off state. The processing in step S805 corresponds to that in step S709 illustrated in FIG. 7.

As described above, connection and disconnection of the wireless LAN communication is controlled according to a detected state of the digital camera 200 in an image captured by the wearable camera 100. Accordingly, the wireless LAN connection control method achieving energy saving while maintaining the intrinsic operability of the wearable camera 100 can be provided.

The determination processing performed by the detection unit 104 according to the present exemplary embodiment is executed on an input captured-image in a unit of a frame, and the detection result indicating the presence or absence of detection of the digital camera 200 is notified to the control unit 101. However, the digital camera 200 may be momentarily included inside the captured image or momentarily away from the captured image. Thus, in a case where the same detection results are continuously obtained from the predetermined number of frames, the determination result may be notified to the control unit 101. In other words, in a case where the same detection results are obtained for a certain number of times (the first number of times), the determination result may be notified to the control unit 101. Moreover, information about time may be used instead of the number of times. In other words, in a case where the same detection results are obtained for a certain time period (a first time period), a determination result can be notified to the control unit 101.

Moreover, the present exemplary embodiment has been described using a case in which wireless LAN communication connection is controlled according to a detected state of the digital camera 200 and an operating mode of the digital camera 200. Particularly, even if the digital camera 200 is not detected, wireless LAN communication connection is not disconnected as long as an operating mode of the digital camera 200 is an image capturing mode. This prevents unnecessary disconnection of the wireless LAN communication even if the user 300 captures an image without looking at a display unit of the digital camera 200 (when the user 300 captures an image without holding the digital camera with his hands, or reaches out his hand(s) holding the digital camera to capture an image). However, in a case where the digital camera 200 remains outside the field of view of the user 300 for a long time, it may be determined that the user 300 is not using the digital camera 200. In such a case, if the digital camera 200 continues undetected for a time period (a second time period) longer than the first time period, the connection with the digital camera 200 may be disconnected. Alternatively, if the digital camera 200 continues undetected for the number of times (the second number of times) greater than the first number of times, the connection with the digital camera 200 may be disconnected.

The determination processing performed by the detection unit 104 according to the present exemplary embodiment has been described using an example of a method for detecting a two-dimensional bar code in a captured image as a method for detecting the digital camera 200 by the wearable camera 100. However, the detection method is not limited thereto. Another method may be employed. For example, information about a shape of the digital camera 200 (image or shape pattern information of the digital camera 200) may be stored beforehand in the wearable camera 100. In such a case, the stored information and a captured image are compared and collated with each other to detect the digital camera 200.

In the aforementioned processing in step S603 of the present exemplary embodiment, if the operating mode of the digital camera 200 is not a mode indicating an image capturing mode or a playback mode, the flow ends without further processing. However, an operating mode of the digital camera 200 may be changed immediately after the processing in step S603. In consideration of such a case, the processing for acquiring the operating mode of the digital camera 200 may be repeated (the processing returns to step S602) after a predetermined time period elapses.

Moreover, in the aforementioned processing in step S803, if the operating mode of the digital camera 200 is an image capturing mode, the processing returns to step S801. However, an operating mode of the digital camera 200 may be changed immediately after the processing in step S803. In consideration of such a case, the processing for acquiring the operating mode of the digital camera 200 may be repeated (the processing returns to step S802) after a predetermined time period elapses.

Hereinafter, a second exemplary embodiment of the present invention is described. In the second exemplary embodiment, a wearable camera 900 serving as an example of a communication device includes a single wireless communication unit serving as a communication unit.

Since many common components are used in the first exemplary embodiment and the present exemplary embodiment, characteristic components of the present exemplary embodiment are mainly described.

<Configuration of Wearable Camera (Communication Device)>

Figure 9:
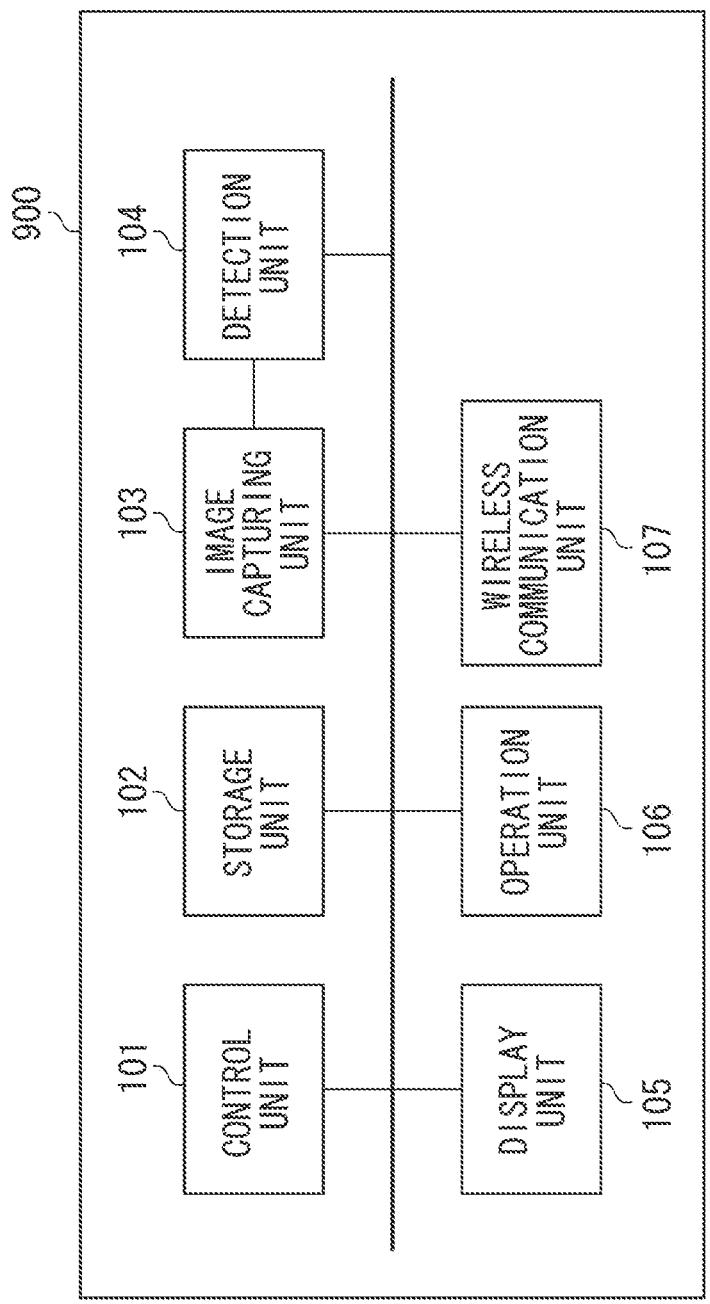
FIG. 9 is a block diagram illustrating a hardware configuration of a wearable camera according to a second exemplary embodiment of the present invention.

FIG. 9 is a block diagram illustrating a hardware configuration of the wearable camera 900 serving as a communication device according to the present exemplary embodiment of the present invention. In comparison with the diagram illustrated in FIG. 1, the hardware configuration of the wearable camera 900 is provided by removing the short-range wireless communication unit 108 from the wearable camera 100 of the first exemplary embodiment.

<Configuration of Digital Camera (External Device)>

Figure 10:
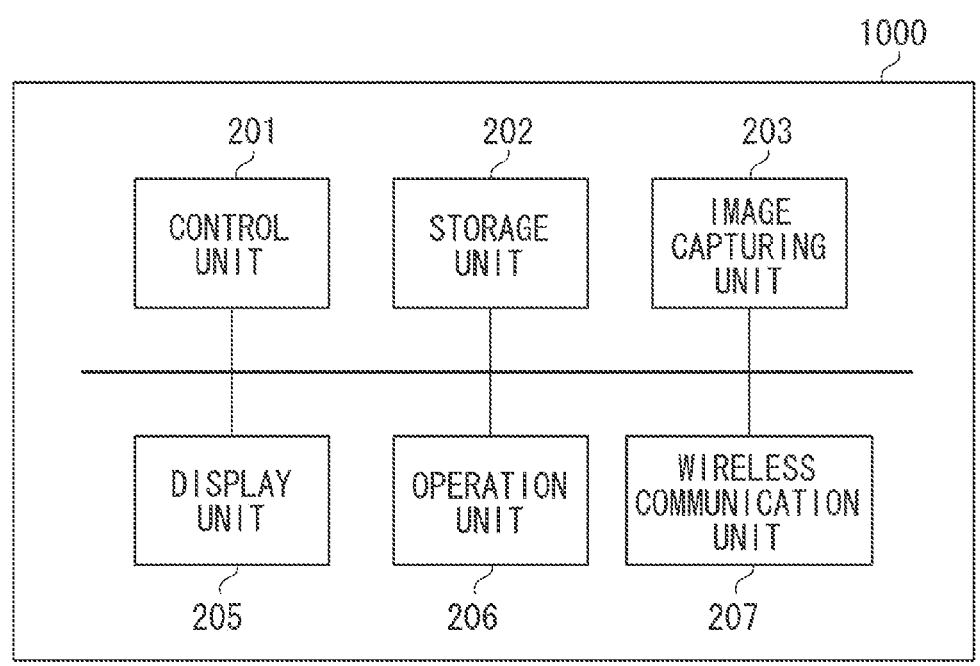
FIG. 10 is a block diagram illustrating a hardware configuration of a digital camera according to the second exemplary embodiment.

FIG. 10 is a block diagram illustrating a hardware configuration of a digital camera 1000 serving as an example of an external device according to the present exemplary embodiment. In comparison with the diagram illustrated in FIG. 2, the hardware configuration of the wearable camera 1000 is provided by removing the short-range wireless communication unit 208 from the digital camera 200 of the first exemplary embodiment.

<Wireless LAN Connection Control Sequence>

Figure 11:
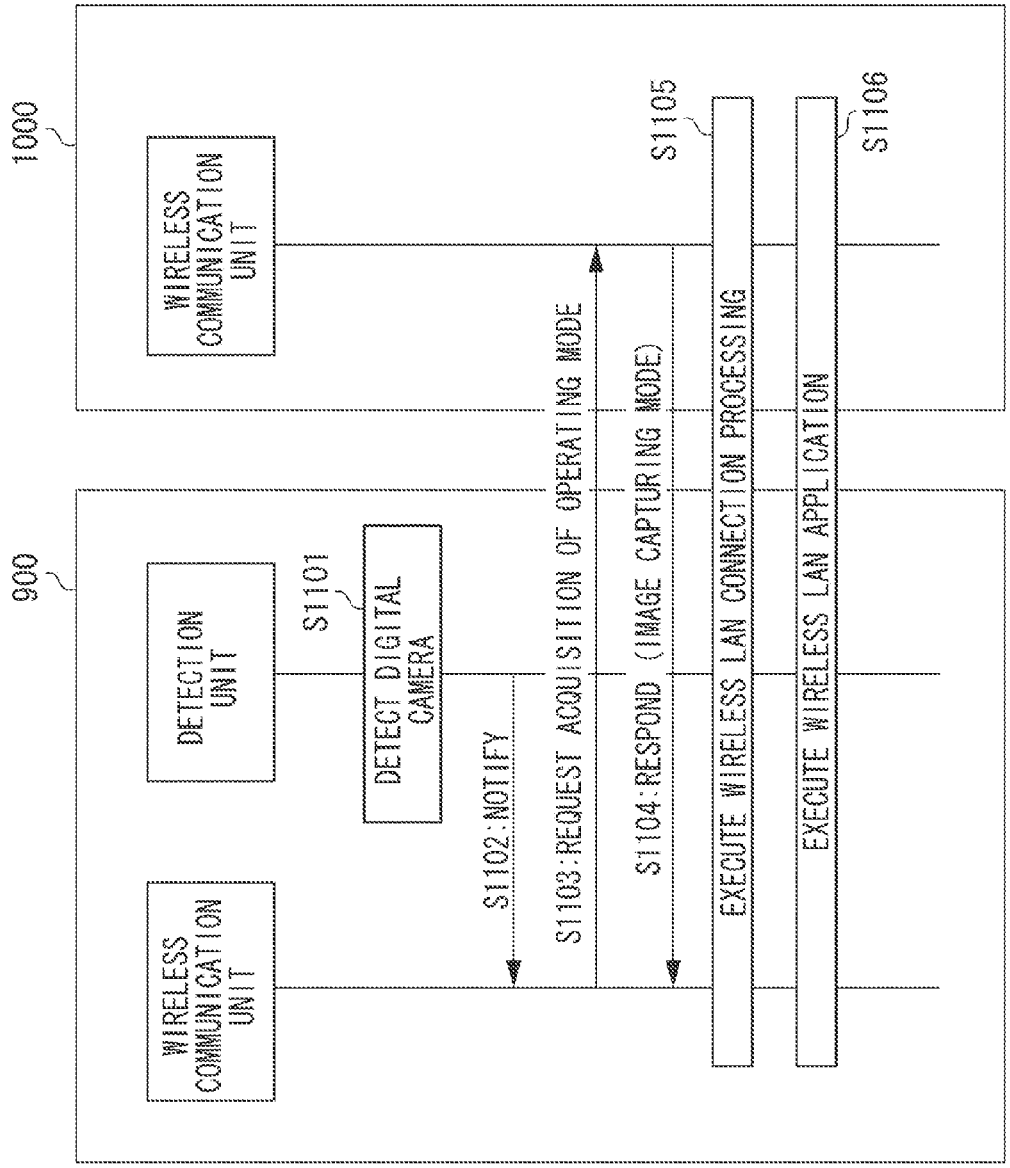
FIG. 11 is a sequence diagram illustrating connection processing of the wireless LAN communication according to the second exemplary embodiment.

FIG. 11 is a sequence diagram illustrating connection processing of wireless LAN communication between the wearable camera 900 and the digital camera 1000 according to the present exemplary embodiment.

In step S1101, processing substantially the same as that in step S402 illustrated in FIG. 4 is executed.

In step S1102, a detection unit 104 of the wearable camera 900 notifies a control unit 101 of detection of the digital camera 1000. Upon receipt of the notification, the control unit 101 notifies a wireless communication unit 107 of the same information.

In step S1103, the wireless communication unit 107 of the wearable camera 900 transmits a packet to request acquisition of operating mode information of the digital camera 1000 to a wireless communication unit 207 of the digital camera 1000.

In step S1104, the wireless communication unit 207 of the digital camera 1000 transmits information about the operating mode of the digital camera 1000 to the wireless communication unit 107 of the wearable camera 900 as a response to the processing in step S1103. Herein, assume that information indicating an image capturing mode is transmitted.

In steps S1103 and S1104, the information is exchanged in a state before communication connection of the wireless LAN communication between the wearable camera 900 and the digital camera 1000 is established. Particularly, an action frame defined by IEEE 802.11u is used.

In step S1105, communication connection in wireless LAN communication using Wi-Fi Direct is established between the wireless communication unit 107 of the wearable camera 900 and the wireless communication unit 207 of the digital camera 1000.

In step S1106, a wireless LAN application is executed between the wireless communication unit 107 of the wearable camera 900 and the wireless communication unit 207 of the digital camera 1000.

<Wireless LAN Connection Control Flow>

Figure 12:
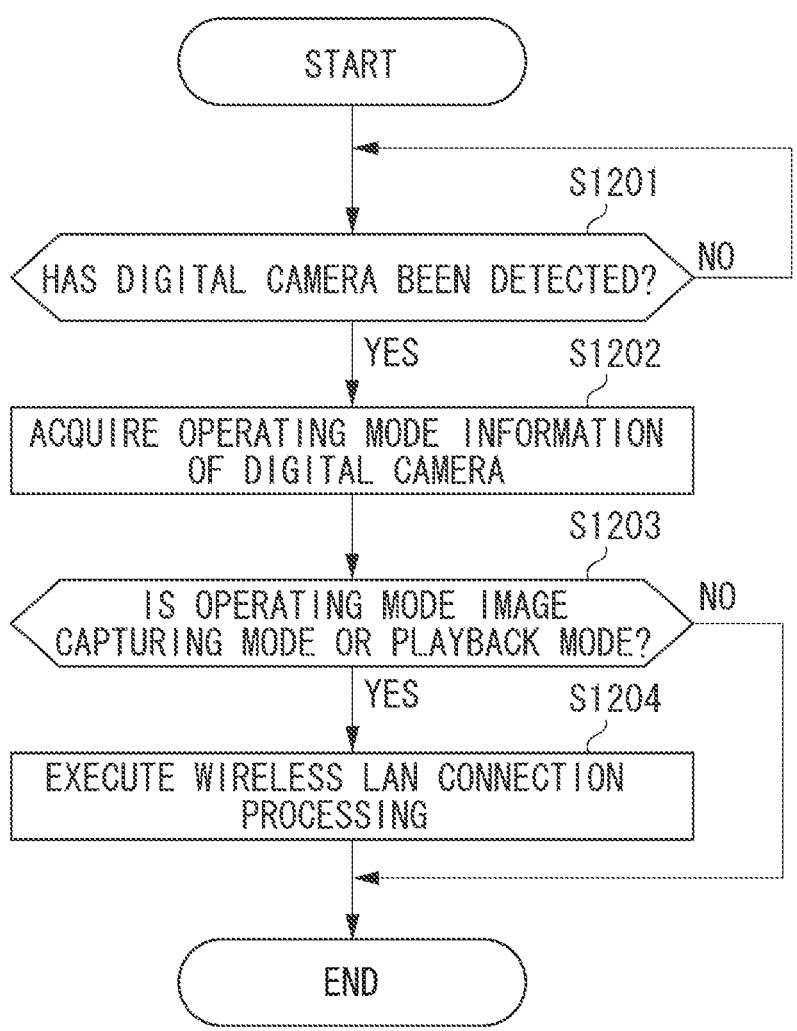
FIG. 12 is a flowchart illustrating a procedure for controlling connection of the wireless LAN communication according to the second exemplary embodiment.

FIG. 12 is a flowchart illustrating a procedure performed the control unit 101 of the wearable camera 900 to control connection of the wireless LAN communication according to the present exemplary embodiment.

In step S1201, the control unit 101 determines whether the digital camera 1000 has been detected via the detection unit 104. The processing in step S1201 corresponds to that in step S1101 illustrated in FIG. 11. If the control unit 101 determines that the digital camera 1000 has been detected (YES in step S1201), the processing proceeds to step S1202.

In step S1202, the control unit 101 controls the wireless communication unit 107 to acquire information about an operating mode of the digital camera 1000. As described above, the processing in step S1202 uses the action frame defined by IEEE 802.11u. The processing in step S1202 corresponds to that in steps S1103 through S1104 illustrated in FIG. 11.

In step S1203, the control unit 101 determines whether the operating mode acquired in step S1202 is a mode indicating an image capturing mode or a playback mode. If the control unit 101 determines that the operating mode is either one of the modes (YES in step S1203), the processing proceeds to step S1204. If the control unit 101 determines that the operating mode is neither one of the modes (NO in step S1203), the flow ends without further processing. When the operating mode is neither the image capturing mode nor the playback mode, the digital camera 1000 may have been powered off.

In step S1204, the control unit 101 controls the wireless communication unit 107 to execute wireless LAN communication connection processing using Wi-Fi direct between the digital camera 1000 and the wearable camera 900. The processing in step S1204 corresponds to that in step S1105 illustrated in FIG. 11.

<Wireless LAN Disconnection Control Sequence>

A description is provided of disconnection processing of the communication established as described above.

Figure 13:
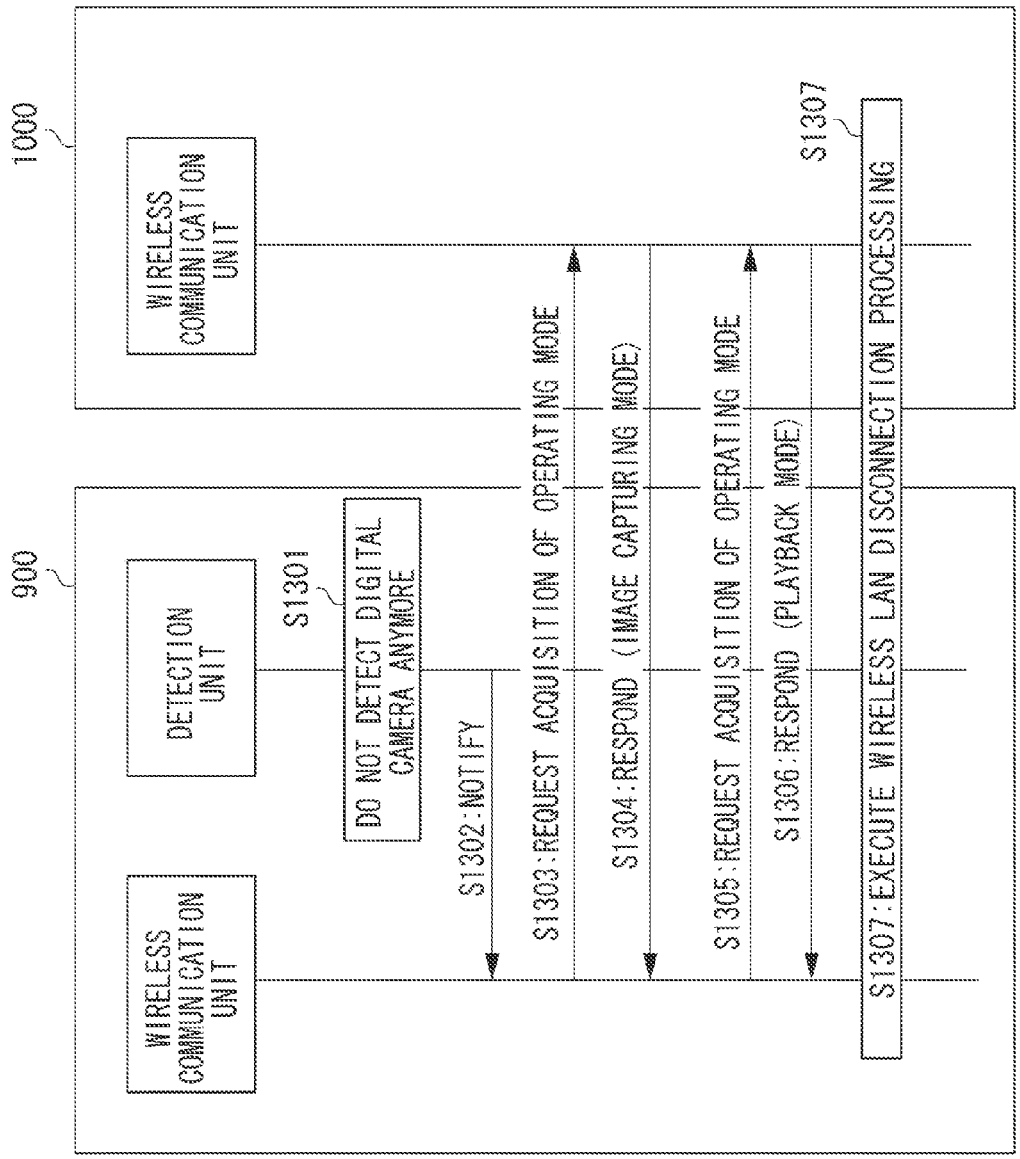
FIG. 13 is a sequence diagram illustrating disconnection processing of the wireless LAN communication according to the second exemplary embodiment.

FIG. 13 is a sequence diagram illustrating disconnection processing of the wireless LAN communication between the wearable camera 900 and the digital camera 1000 according to the present exemplary embodiment.

Assume that the wireless LAN communication connection processing described above with reference to FIG. 11 is executed in advance as an initial state.

In step S1301, the detection unit 104 of the wearable camera 900 detects that the digital camera 1000 is no longer included in an image. In other words, the detection unit 104 detects that a two-dimensional bar code of the digital camera 1000 is no longer recognized from the image. Such detection is substantially equivalent to detection of a case where the digital camera 1000 is out of the field of view of the user.

In step S1302, the detection unit 104 of the wearable camera 900 notifies the control unit 101 that the digital camera 1000 is no longer detected. Upon receipt of the notification, the control unit 101 notifies the wireless communication unit 107 of the same information.

In step S1303, the wireless communication unit 107 of the wearable camera 900 transmits a packet to request acquisition of operating mode information of the digital camera 1000 to the wireless communication unit 207 of the digital camera 1000.

In step S1304, the wireless communication unit 207 of the digital camera 1000 transmits information about the operating mode of the digital camera 1000 to the wireless communication unit 107 of the wearable camera 900 as a response to the processing in step S1303. Herein, assume that information indicating an image capturing mode is transmitted. In such a case, the wearable camera 900 remains connected.

In step S1305, the wireless communication unit 107 of the wearable camera 900 again transmits a packet to request acquisition of the operating mode information of the digital camera 1000 to the wireless communication unit 207 of the digital camera 1000. The processing in steps S1303 through S1305 is repeated until information indicating a mode other than the image capturing mode is received.

In step S1306, the wireless communication unit 207 of the digital camera 1000 transmits the information about the operating mode of the wearable camera 100 to the wireless communication unit 107 of the wearable camera 900 as a response to the processing in step S1305. Herein, assume that information indicating a playback mode is transmitted.

Subsequently, in step S1307, communication connection in the wireless LAN communication between the wireless communication unit 107 of the wearable camera 900 and the wireless communication unit 207 of the digital camera 1000 is disconnected.

<Wireless LAN Disconnection Control Flow>

Figure 14:
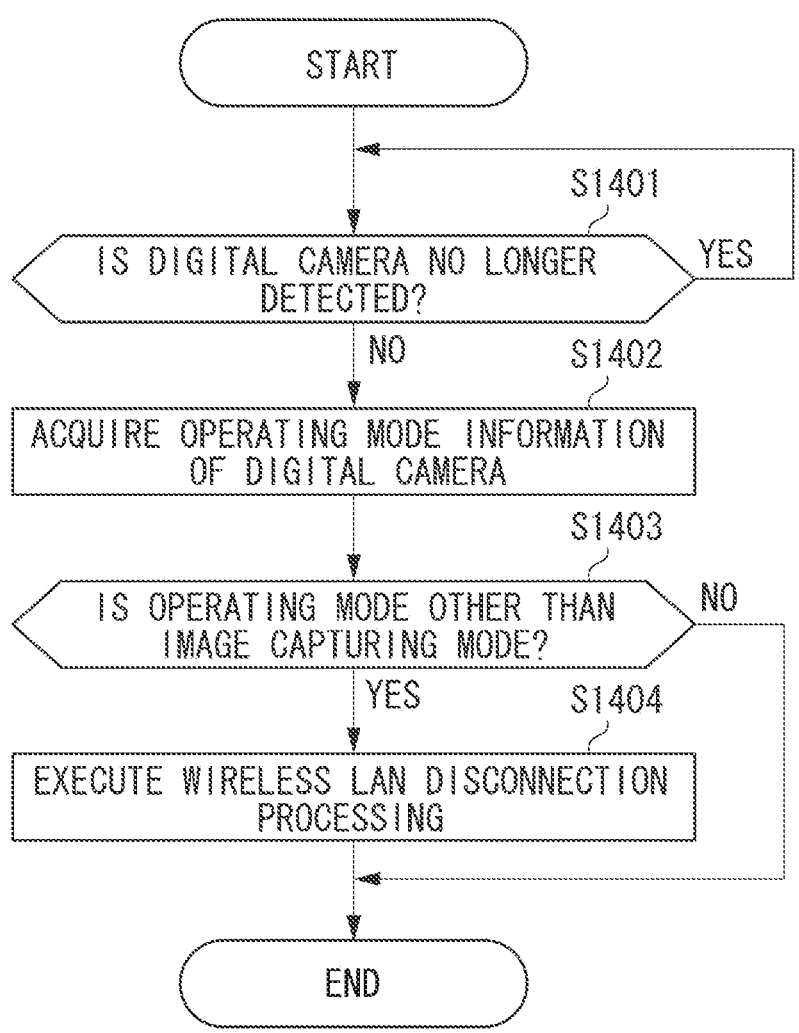
FIG. 14 is a flowchart illustrating a procedure for controlling disconnection of the wireless LAN communication according to the second exemplary embodiment.

FIG. 14 is a flowchart illustrating a procedure performed by the control unit 101 of the wearable camera 900 to control disconnection of the wireless LAN communication according to the second exemplary embodiment.

In step S1401, the control unit 101 determines whether the digital camera 1000 is no longer detected via the detection unit 104. The processing in step S1401 corresponds to that in step S1301 illustrated in FIG. 13. If the control unit 101 determines that the digital camera 1000 is no longer detected (NO in step S1401), the processing proceeds to step S1402.

In step S1402, the control unit 101 controls the wireless communication unit 107 to acquire information about an operating mode of the digital camera 1000. The processing in step S1402 corresponds to that in step S1303 or S1305 illustrated in FIG. 13.

In step S1403, the control unit 101 determines whether the operating mode acquired in step S1402 indicates a mode other than an image capturing mode. If the control unit 101 determines that the operating mode is other than the image capturing mode (YES in step S1403), the processing proceeds to step S1404. On the other hand, if the control unit 101 determines that the operating mode is the image capturing mode (NO in step S1403), the flow ends without further processing.

In step S1404, the control unit 101 executes processing for disconnecting the communication connection of the wireless LAN communication between the wearable camera 900 and the digital camera 1000. The processing in step S1404 corresponds to that in step S1307 illustrated in FIG. 13.

According to such an exemplary embodiment, a wearable camera includes a single wireless communication unit serving as a communication unit, and connection and disconnection of wireless LAN communication can be controlled according to a detected state of the digital camera inside an image captured by the wearable camera.

Therefore, connection and disconnection of wireless LAN communication is controlled using an action frame defined by IEEE 802.11u according to a detected state of the digital camera in an image captured by the wearable camera. This can provide a wireless LAN connection control method with the intrinsic operability of the wearable camera being maintained even if the wearable camera includes a single wireless communication unit serving as a communication unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-109421, filed May 29, 2015, which is hereby incorporated by reference herein in its entirety.

What is claimed is:

1. A communication device comprising:
an image capturing unit configured to capture an object to acquire an image of the object;
a detection unit configured to continuously determine a presence of an external device based on the image acquired by the image capturing unit;
a first wireless communication unit configured to perform wireless communication according to a first communication standard; and
a control unit configured to perform control so that processing for establishing wireless communication with the external device via the first wireless communication unit is started if the external device is detected by the detection unit,
wherein, if the external device is not detected by the detection unit for a certain time period after the wireless communication with the external device is established by the first wireless communication unit, the control unit performs control so that the wireless communication with the external device by the first wireless communication unit is disconnected, and wherein, if the external device is again detected by the detection unit before the certain time period elapses, the control unit performs control so that the wireless communication with the external device by the first wireless communication unit remains connected.

2. The communication device according to claim 1, further comprising a second wireless communication unit configured to perform wireless communication according to a second communication standard different from the first communication standard, the second wireless communication unit being different from the first wireless communication unit,
   wherein, if the presence of the external device is detected by the detection unit, the control unit performs control so that information about an operating mode of the external device is acquired via the second wireless communication unit before performing control so that the wireless communication with the external device is established via the first wireless communication unit, and
   wherein, according to the operating mode of the external device, the control unit selects whether to perform control so that the wireless communication with the external device is established via the first wireless communication unit.

3. The communication device according to claim 2, wherein the second wireless communication unit consumes less power than the first wireless communication unit.

4. The communication device according to claim 2, wherein, if an operating mode of the external device is an image capturing mode or a playback mode, the control unit performs control so that the wireless communication with the external device is established via the first wireless communication unit.

5. The communication device according to claim 1, wherein, if the presence of the external device is detected by the detection unit, the control unit performs control so that information about an operating mode of the external device is acquired via the first wireless communication unit before performing control so that the wireless communication with the external device is established via the first wireless communication unit, and
   wherein, according to the operating mode of the external device, the control unit selects whether to perform control so that the wireless communication with the external device is established via the first wireless communication unit.

6. The communication device according to claim 5, wherein, if an operating mode of the external device is an image capturing mode, the control unit performs control so that the wireless communication with the external device by the first wireless communication unit is not disconnected even in a case where the external device is not detected by the detection unit for the certain time period after the wireless communication with the external device is established by the first wireless communication unit.

7. The communication device according to claim 5, wherein, if an operating mode of the external device is an image capturing mode, the control unit performs control so that the wireless communication with the external device by the first wireless communication unit is not disconnected even in a case where the external device is not detected by the detection unit for the certain time period after the wireless communication with the external device is established by the first wireless communication unit, and
   wherein, if a predetermined time period longer than the certain time period elapses with the external device remaining undetected by the detection unit, the control unit performs control so that the wireless communication with the external device by the first wireless communication unit is disconnected.

8. The communication device according to claim 1, wherein, if the presence of the external device is not detected by the detection unit after the wireless communication with the external device is established by the first wireless communication unit, the control unit performs control so that information about an operating mode of the external device is acquired via the first wireless communication unit,
   wherein, if the operating mode of the external device that has been acquired when the presence of the external device is not detected by the detection unit is an image capturing mode, the control unit performs control so that the wireless communication with the external device by the first wireless communication unit remains connected, and
   wherein, if the operating mode of the external device that has been acquired when the presence of the external device is not detected by the detection unit is not an image capturing mode, the control unit performs control so that the wireless communication with the external device by the first wireless communication unit is disconnected.

9. The communication device according to claim 1, wherein the communication device has a first mode in which the first wireless communication unit is operated with a predetermined power consumption, and a second mode in which the first wireless communication unit is either not operated or operated with a power consumption less than a predetermined power consumption,
   wherein, if the presence of the external device is detected by the detection unit in a state that the first wireless communication unit is in the second mode, the control unit performs control so that the first wireless communication unit is shifted to the first mode.

10. The communication device according to claim 1, wherein the detection unit detects the presence of the external device based on a determination of whether the image acquired by the image capturing unit includes a predetermined marker.

11. The communication device according to claim 1, wherein the detection unit detects the presence of the external device based on the image acquired by the image capturing unit and information about a predetermined device shape, wherein the information is stored in advance.

12. A control method for a communication device, the control method comprising:
   acquiring an image of an object by capturing the object;
   continuously determining a presence of an external device based on the acquired image;
   executing wireless communication according to a first communication standard; and
   performing control so that processing for establishing wireless communication with the external device is started if the external device is detected,
   wherein, if the external device is not detected for a certain time period after the wireless communication with the external device is established according to the first communication standard, performing control so that the wireless communication with the external device according to the first communication standard is disconnected, and
   wherein, if the external device is detected again before the certain time period elapses, performing control so that the wireless communication with the external device according to the first communication standard remains connected.

13. A non-transitory computer-readable storage medium storing computer executable instructions for causing a computer to execute a method, the method comprising:
   acquiring an image of an object by capturing the object;
   continuously determining a presence of an external device based on the image acquired by the acquiring;
   executing wireless communicating according to a first communication standard;
   performing control so that processing for establishing wireless communication with the external device is started if the external device is detected,
   wherein, if the external device is not detected for a certain time period after the wireless communication with the external device is established according to the first communication standard, performing control so that the wireless communication with the external device according to the first communication standard is disconnected, and
   wherein, if the external device is detected again before the certain time period elapses, performing control so that the wireless communication with the external device according to the first communication standard remains connected.

14. A communication device comprising:
   one or more lens;
   a first wireless communication unit;
   a memory for storing data and a computer program; and
   one or more processors coupled to the memory for executing the computer program, the computer program comprising instructions for:
   capturing an object via the lens to acquire an image of the object;
   continuously determining a presence of an external device based on the image acquired by the image capturing unit;
   performing wireless communication via the first wireless communication unit according to a first communication standard; and
   performing control so that processing for establishing wireless communication with the external device via the first wireless communication unit is started if the external device is detected,
   wherein, if the external device is not detected for a certain time period after the wireless communication with the external device is established, the control unit performs control so that the wireless communication with the external device is disconnected, and
   wherein, if the external device is again detected before the certain time period elapses, the control unit performs control so that the wireless communication with the external device remains connected.

15. The communication device according to claim 14, further comprising a second wireless communication unit;
   wherein the computer program further comprising instructions for:
   performing wireless communication according to a second communication standard different from the first communication standard, the second wireless communication unit being different from the first wireless communication unit,
   wherein, if the presence of the external device is detected, performing control so that information about an operating mode of the external device is acquired via the second wireless communication unit before performing control so that the wireless communication with the external device is established via the first wireless communication unit, and
   wherein, according to the operating mode of the external device, selecting whether to perform control so that the wireless communication with the external device is established via the first wireless communication unit.

16. The communication device according to claim 15, wherein the second wireless communication unit consumes less power than the first wireless communication unit.

17. The communication device according to claim 15, wherein the computer program further comprising instructions for:
   if an operating mode of the external device is an image capturing mode or a playback mode, performing control so that the wireless communication with the external device is established via the first wireless communication unit.

18. The communication device according to claim 14, wherein, the computer program further comprising instructions for:
   if the presence of the external device is detected, performing control so that information about an operating mode of the external device is acquired via the first wireless communication unit before performing control so that the wireless communication with the external device is established via the first wireless communication unit, and
   wherein, according to the operating mode of the external device, selecting whether to perform control so that the wireless communication with the external device is established via the first wireless communication unit.

19. The communication device according to claim 18, wherein the computer program further comprising instructions for:
   if an operating mode of the external device is an image capturing mode, performing control so that the wireless communication with the external device by the first wireless communication unit is not disconnected even in a case where the external device is not detected for the certain time period after the wireless communication with the external device is established by the first wireless communication unit.

20. The communication device according to claim 18, wherein the computer program further comprising instructions for:
   if an operating mode of the external device is an image capturing mode, performing control so that the wireless communication with the external device by the first wireless communication unit is not disconnected even in a case where the external device is not detected for the certain time period after the wireless communication with the external device is established by the first wireless communication unit, and
   wherein, if a predetermined time period longer than the certain time period elapses with the external device remaining undetected, performing control so that the wireless communication with the external device by the first wireless communication unit is disconnected.

* * * * *